Figure 1:
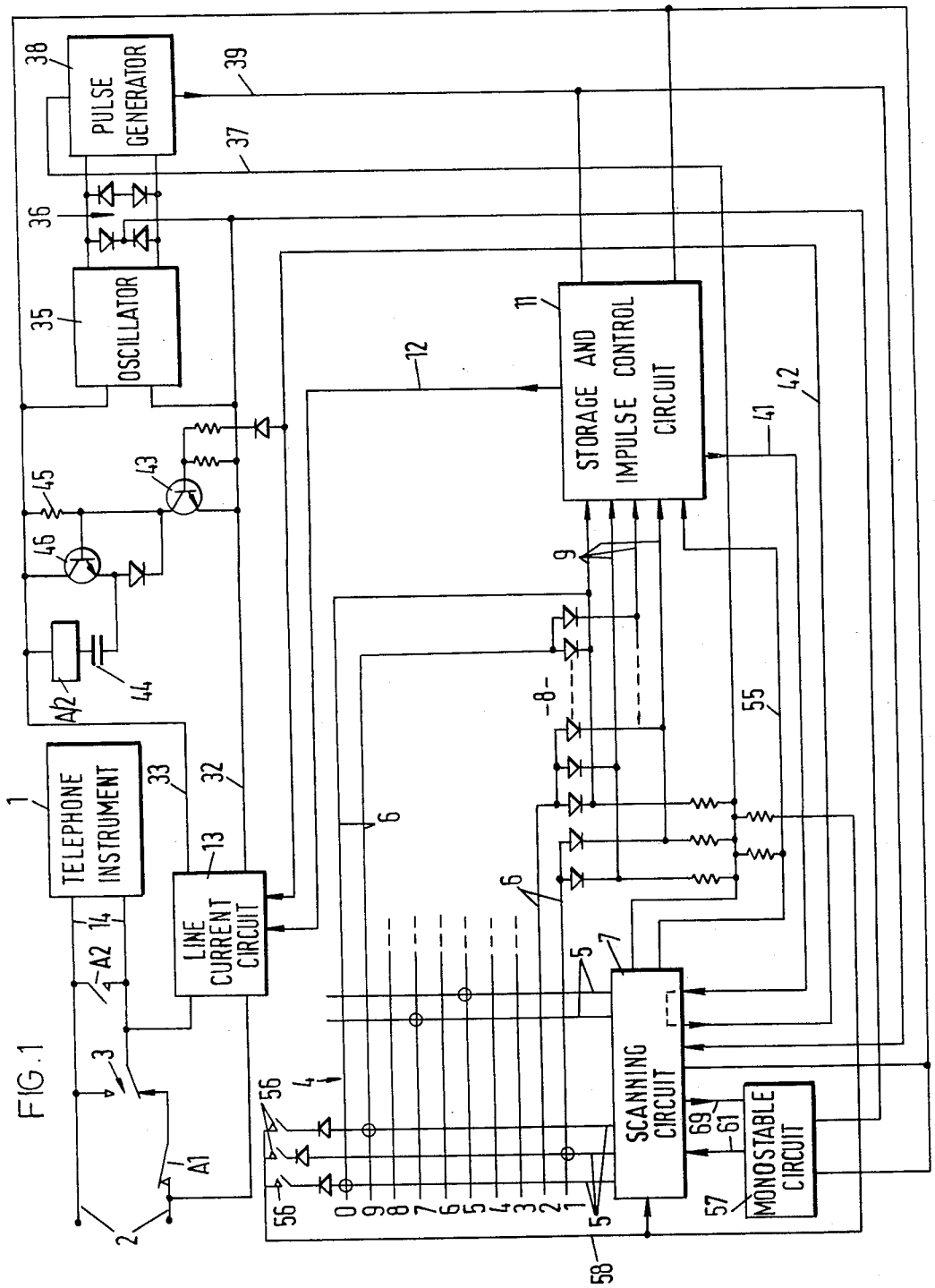

United States Patent [19]

Connolly et al.

[11] 4,032,722

[45] June 28, 1977

[54] TELEPHONE DIALING ARRANGEMENT FOR CALLING A SINGLE PARTY

[75] Inventors: David Charles Antony Connolly, Shildon; Robert Andrew Stevenson, Newton Aycliffe, both of England

[73] Assignee: The General Electric Company Limited, London, England

[22] Filed: Apr. 29, 1975

[21] Appl. No.: 572,934

[30] Foreign Application Priority Data

Apr. 30, 1974 United Kingdom ............ 18927/74

[52] U.S. Cl. .......................... 179/18 BB; 179/90 B
[51] Int. Cl.² ..................................... H04M 1/272
[58] Field of Search .................. 179/18 BB, 90 B, 88

[56] References Cited

UNITED STATES PATENTS

| | | | |
|---|---|---|---|
| 3,692,962 | 9/1972 | Raczynski et al. | 179/175.2 R |
| 3,790,721 | 2/1974 | Mühlbauer et al. | 179/90 B |
| 3,856,982 | 12/1974 | Lawson et al. | 179/90 R |
| 3,860,765 | 1/1975 | McCabe et al. | 179/90 B |
| 3,872,467 | 3/1975 | Daniels et al. | 179/90 B X |

FOREIGN PATENTS OR APPLICATIONS

| | | | |
|---|---|---|---|
| 1,240,564 | 5/1967 | Germany | 179/90 B |
| 1,105,501 | 3/1968 | United Kingdom | 179/90 B |

*Primary Examiner*—Thomas W. Brown
*Attorney, Agent, or Firm*—Kirschstein, Kirschstein, Ottinger & Frank

[57] ABSTRACT

Apparatus including a telephone instrument for connection to a public telephone system has provision for a call connection to be set up through the system to just a single party upon operation of a single push-button. A plurality of electric switches are preset (usually prior to installation of the instrument) to characterize the directory number of the party that can be called. Upon operation of the push-button, electronic circuitry scans the switches characterizing the directory number to cause the decimal digits of that number to be written sequentially into storage circuitry which subsequently generates a train of impulses in respect of each such digit for transmission to line. There is provision for the scanning operation to be halted for a predetermined period after some of the digits have been written into the storage circuitry.

9 Claims, 3 Drawing Figures

TELEPHONE DIALING ARRANGEMENT FOR CALLING A SINGLE PARTY

This invention relates to telephone apparatus and is more particularly concerned with apparatus for connection, for example over a pair of line wires, to an automatic telephone exchange.

It is well known to provide a line on a permanent basis between two locations between which a speech circuit is required from time to time. For example a telephone instrument in a police box or unattended police station that is available to the public for emergency calls may be connected by such a line to a switchboard at a police station that is permanently manned.

It has now been realized that if the location to which it is periodically required to make such a call is already connected to an automatic exhange, the required facility may be achieved without having a dedicated circuit extending the whole way between the two locations. All that is required is a dedicated circuit from the location in question to an automatic exchange and for the apparatus at that location to include equipment for automatically transmitting trains of impulses (similar to 'dial' impulses) that characterize the number of the party to which connection is required so as to enable the desired circuit to be set up as soon as it is needed for a call.

According to one aspect of the present invention, in telephone apparatus which includes a telephone instrument and which is arranged to supply to a telephone line to which the apparatus is connected during use trains of "dial" impulses characterizing a single predetermined party to whom the telephone instrument may be connected via an automatic exchange after a user has initiated a call, a plurality of passive means are adapted respectively to store in pre-set manner the number of impulses of said trains and scanning means is arranged to scan said passive means to cause the numbers stored by the passive means to be written one at a time into an active electronic storage and conversion means which is then arranged to cause trains of impulses to be generated for transmission to line in respect of the numbers stored thereby, the apparatus also including manually operated means, for example a push-button, and said storage and conversion means and said scanning means are arranged to be brought into use to generate the trains of impulses upon operation by the user of said manually operable means subsequent to having initiated a call.

During use of the apparatus, a user would normally initiate a call (for example by lifting the handset of the telephone instrument) and then await receipt of dial tone before operating the manually-operable means.

Preferably the apparatus is batteryless, there being means to utilize part of the line current during use of the apparatus to power said storage and conversion means and said scanning means.

Said storage and conversion means preferably includes a dynamic store of the recirculating type which is arranged to store the numbers written into this means as aforesaid.

Each of said passive means may consist of a multi-way switch, for example a thumb-wheel switch, having at least ten positions corresponding respectively to numbers of impulses from one to ten. There may be provision for the scanning operation to be temporarily halted (for example to await receipt of dial tone again). When operation of said scanning means has been halted in this way scanning of the unscanned passive means may be resumed after a predetermined delay or upon re-operation of said manually operable means.

According to a feature of the present invention, equipment which is for use with a telephone instrument and which is arranged to supply trains of dial impulses characterizing a single predetermined part to whom the telephone instrument may be connected via an automatic exchange comprises a plurality of passive means which are adapted respectively to store in preset manner the number of impulses of said trains, active electronic storage and conversion means, and scanning means arranged to scan said passive means to cause the numbers stored thereby to be written one at a time into said storage and conversion means which is then arranged to cause the required trains of impulses to be generated in respect of the numbers stored thereby, said scanning means and said storage and conversion means being arranged to be brought into use to generate the trains of impulses in response to an electric control signal being supplied to the equipment. During use, the control signal may result from operation of a push-button or other manually operable means when the trains of impulses are required to be generated.

Figure 2:
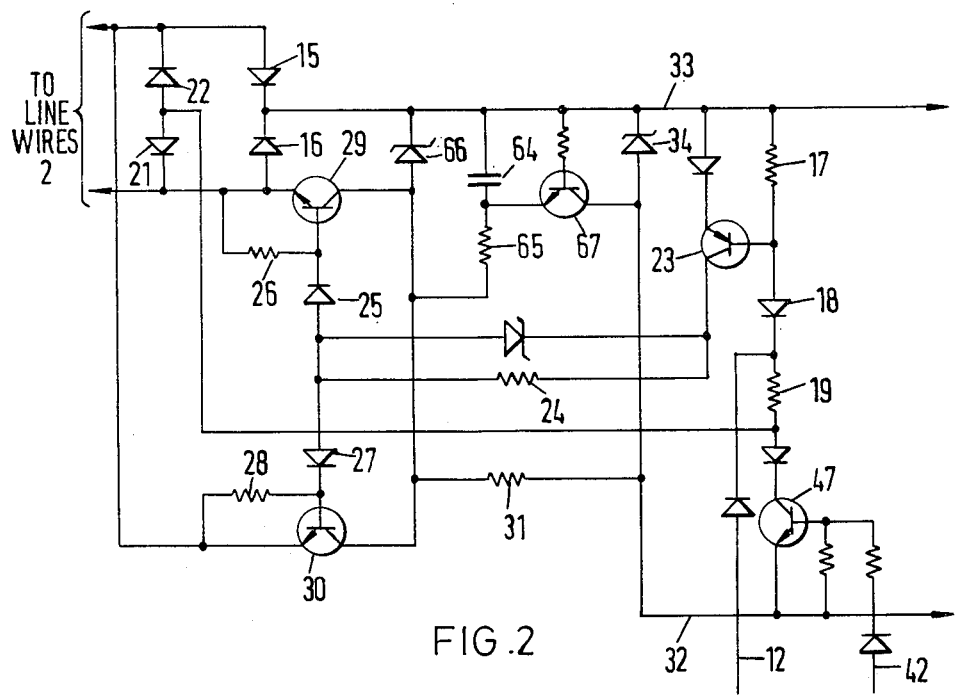
Figure 3:
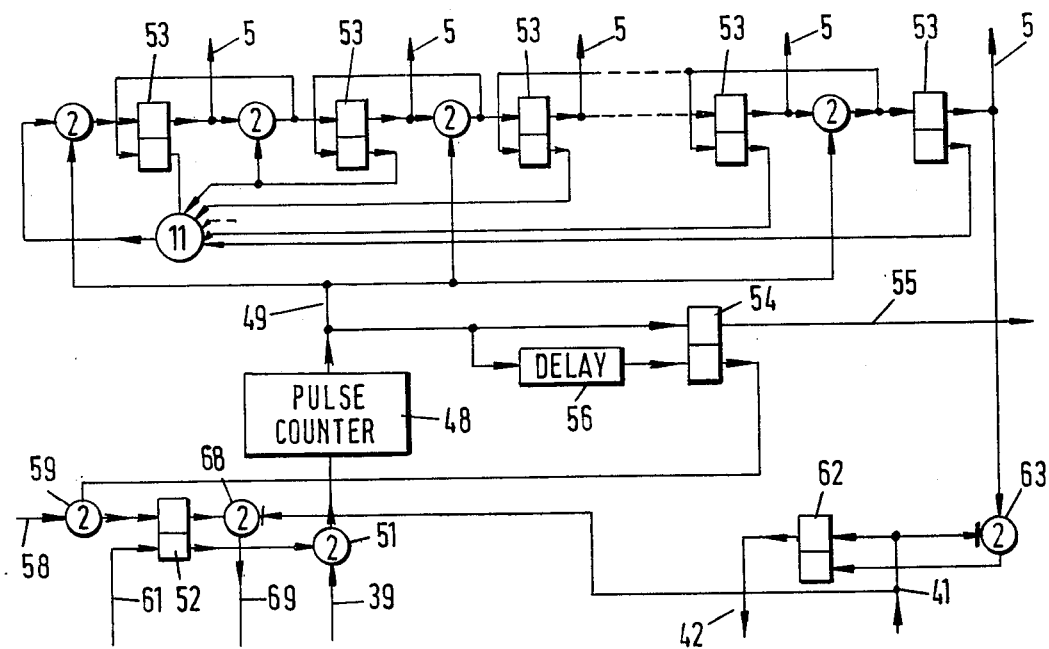

One example of telephone apparatus in accordance with the present invention will now be described with reference to the accompanying drawings in which FIG. 1 shows diagrammatically the circuit of the complete apparatus, FIG. 2 shows in more detail the circuit of part of the apparatus of FIG. 1, and FIG. 3 shows the logic of another part of the apparatus of FIG. 1.

Referring to FIG. 1 of the accompanying drawings, the telephone apparatus now to be described includes a conventional telephone instrument 1 for connection to an automatic exchange of a public telephone network over a normal pair of line wires 2. The instrument 1 does not have a dial or other device to enable a user to set up a call connection through the exchange and, since it is a standard item, will not be described further herein. The apparatus does however have provision for trains of dial impulses to be supplied to the line wires 2 to characterize one particular party connected to the public network upon manual operation of a push-button 3. The apparatus may therefore only be used to make a call to that one party.

The telephone number of the party to whom connection may be made is stored by a switch unit 4. The switch unit 4 comprises 11 manually operable 10-way switches (of which only five are shown in the drawing) and each of these switches enables one of 11 leads 5 to be selectively connected to any one of 10 leads 6. The individual switches of the unit 4 may conveniently be of the thumb wheel type or of the type having a rectilinearly movable slider. In FIG. 1 the positions of the five switches shown is represented by a circle at the intersection of the appropriate leads 5 and 6 that are interconnected so that the unit 4 is storing the number "019 ... 75." Setting of the individual switches of the unit 4 is usually undertaken when the apparatus is initially installed and is not subsequently changed.

A scanning unit 7 is arranged sequentially to supply signals to the leads 5 and upon such a signal being supplied to any particular lead 5, the signal appears on one of the leads 6 giving a one-out-of-ten coding of the digit value of the appropriate switch of the switch unit 4. A diode matrix 8 is arranged to convert this coding into 4 bit binary form, the appropriate binary signals being supplied in parallel over four leads 9. A suitable code conversion for the matrix 8 (only part of which is shown in the drawing) is given below

| Decimal Digit Value | Binary Coding |
| --- | --- |
| 0 | 0100 |
| 9 | 1010 |
| 8 | 1100 |
| 7 | 0110 |
| 6 | 1011 |
| 5 | 1111 |
| 4 | 0111 |
| 3 | 1001 |
| 2 | 1101 |
| 1 | 0101 |

An active electronic circuit 11 is connected to the leads 9 and is arranged to store a succession of digit values passed thereto upon the several switches of the switch unit 4 being scanned as aforesaid. In response to the digit values stored thereby, the circuit 11 is also arranged to supply signals over a lead 12 to a circuit 13 to cause the circuit 13 to generate the required trains of impulses characterizing the stored number that are to be supplied to the line wire 2 for transmission to the exchange. The circuit 11 is essentially of the form described more fully in the specification of U.S. Pat. No. 3,601,552 and includes a dynamic store of the recirculating type.

The apparatus under consideration is batteryless, the power necessary for operation of the scanning circuit 7 and the storage and impulse control circuit 11 being obtained via the line current circuit 13 from the flow of direct current over the line wires 2 during use of the apparatus.

The operation of the apparatus will now be considered in more detail. When a call connection is to be set up to the predetermined party, the handset (not shown) of the telephone instrument 1 is lifted and the gravity switch (also not shown) of the instrument is closed so as to connect the leads 14. By way of contacts of the push-button 3 and normally closed relay contacts A1 this causes the line wires 2 to be looped. When the user hears dial tone returned from the exchange, he presses the push-button 3 (which may be mounted on the telephone instrument 1 or separate therefrom). The effect of this is momentarily to connect the line current circuit 13 directly across the line wires 2.

Referring now to FIG. 2 of the accompanying drawings which shows the line current circuit 13 in more detail, operation of the push-button 3 as aforesaid causes current to flow through the diode 15 (or the diode 16 depending upon the line polarity), a resistor 17, a diode 18, resistors 19 and 20 and a diode 21 (or 22). The voltage drop across the resistor 17 causes the transistor 23 to conduct and the resulting current flow through resistor 24 and either the diode 25 and resistor 26 or the diode 27 and resistor 28 causes the transistor 29 or 30 (depending on the line polarity) to conduct, thereby establishing a low impedance path between the line wires 2 through the zener diode 66. A portion of the resulting line current flows through a resistor 31 to the line 32. The effect of this is that the line 33 is at earth potential while the line 32 has a negative potential of approximately 4 volts as determined by a zener diode 34.

The voltage supplied by the line current circuit 13 between the leads 33 and 34 is utilized to energize a free running oscillator 35. The output from the oscillator 35 is rectified by means of a rectifier bridge 36 and the resulting voltage is added to that on the line 34 so that the line 37 has a negative voltage of approximately 20 volts with respect to earth. This voltage is utilized to operate a clock pulse generator 38 the frequency of which is controlled by the oscillator 35 and the clock pulses supplied over the lead 39 are utilized to power the scanning circuit 7 and the storage and impulse control circuit 11 both of which are of integrated circuit form.

Upon the scanning circuit 7 being powered, a signal is supplied over the first lead 5 with the result that signals characterizing the decimal digit value determined by the position of the first switch of the switch unit 4 are supplied to the storage and impulse control circuit 11 over the leads 9. The first digit of the telephone number of the wanted party is thus stored by the circuit 11 and whenever the circuit 11 is storing one or more digits that have not been impulsed out, an "off-normal" signal is supplied over a lead 41. As will subsequently be described, this signal is passed through the scanning circuit 7 so that a signal appears on the lead 42.

The "off-normal" signal on the lead 42 is approximately earth potential (whereas negative potential appears on that line when there is no such signal) and this causes a transistor 43 to conduct and the resulting flow of current to charge a capacitor 44 operates a relay A which is of the magnetically latching type. Thus the relay contacts A1 open and contacts A2 close. This directly connects the line current circuit 13 across the line wires 2 and occurs before the contacts of the push-button 3 have returned to normal. (It is convenient for this purpose to use magnetically latching reed relays each having only a single pair of contacts. In this case the contacts A1 and A2 are of two separate relays, the operating winding of each of these relays being connected in series with a capacitor corresponding to capacitor 44 in two parallel paths.) At this time the flow of current through the resistor 45 biases a transistor 46 to be non-conducting. It is convenient to mention here that when, at a later time, the transistor 43 is cut off, the transistor 46 is temporarily caused to conduct and discharge the capacitor 44, the resulting flow of current releasing the relay A.

The "off-normal" signal on the lead 42 also causes a transistor 47 in the line current circuit 13 (FIG. 2) to conduct and thereby hold the transistor 23 conducting.

As previously mentioned, signals are supplied by the storage and impulse control circuit 11 over the lead 12 to the line current circuit 13 to control the generation of impulses supplied to the line wires 2. Such an impulse generating signal is of approximate earth potential (as compared to the more negative potential otherwise present on the lead 12) and this causes the diode 18 to be biased so as not to conduct, thereby interrupting the direct current path through the line current circuit 13 between the line wires 2 that has previously been described. At the same time the transistor 23 is cut off and this in turn causes the transistor 29 or 30 that had previously been conducting to be non-conducting, thereby interrupting the loop through the zener diode 66.

It is, of course, necessary for the circuits 7 and 11 to continue to be powered during impulse breaks in the path through the line current circuit 13 between the line wires 2. For this purpose a capacitor 64 is provided and is arranged to be charged (in the absence of an impulse break in the loop) by line current flowing through the transistor 29 (or 30) and a resistor 65. The zener diode 66 has a higher breakdown voltage than the zener diode 34 so that the transistor 67 is conducting and, upon the occurrence of an impulse break, the circuits 7 and 11 draw current over the line 32 from the capacitor 64.

Referring now to FIG. 3, the scanning circuit 7 (FIG. 1) comprises a pulse counter 48 which is arranged to count clock pulses supplied over the lead 39 so as to supply a pulse over a lead 49 once every 100 milliseconds. (At this time an enabling signal is supplied to the gate 51 by a bistable circuit 52.) Pulses supplied over the lead 49 are arranged to cause bistable circuits 53 to be triggered in turn so as to cause the required signals to be supplied via the leads 5 to the switches of the switch unit 4 (FIG. 1). These signals on the leads 5 thus appear sequentially at intervals of 100 milliseconds.

Each pulse supplied by the counter 48 is utilized to trigger a bistable circuit 54 which then supplies a strobe signal over a lead 55 to the circuit 11. A bistable circuit 54 is reset after a period of approximately 50 milliseconds by the triggering pulse after it has been delayed by a delay unit 56. Each strobe signal supplied over the lead 55 causes the binary coded decimal digit represented by signals on the leads 9 to be stored by the circuit 11.

As so far described the apparatus enables all the decimal digits of the telephone number identified by the position of the switches of the switch unit 4 to be transferred to the circuit 11 in turn and subsequently to be represented by trains of dial impulses supplied to the line wires 2. In some cases the trains of dial impulses cannot follow immediately after one another and it is necessary for operation of the scanning circuit 7 to be temporarily halted. If such a halt is required after the first, second or third digit the appropriate switch 56 is closed so that, in addition to writing that digit into the circuit 11, the supply of a signal over the relevant lead 5 also supplies a signal over a lead 58 to cause a monostable circuit 57 to be triggered to its astable state. Upon cessation of the strobe signal on the lead 55 to write that digit into the circuit 11 an enabling signal is supplied to a gate 59 so as to cause the bistable circuit 52 to be triggered. This removes the enabling signal from the gate 51 so that further operation of the pulse counter 48 is interrupted. At the end of a predetermined period, which may be in the region of two to five seconds, the monostable circuit 57 returns to its normal state and a signal is supplied over a lead 61. This signal resets the bistable 52 so that the enabling signal to the gate 51 is restored and operation of the pulse counter 48 is resumed.

In the circumstances described in the last paragraph, it will be appreciated that the digit written into the circuit 11 will have been impulsed out to line before the monostable circuit 57 returns to its normal state with the result that the "off-normal" signal on the lead 41 will have disappeared. It is necessary therefore for the "off-normal" signal on the lead 42 to continue at this time so as to maintain the relay A operated. This is achieved within the scanning circuit 7 by means of another bistable 62 and a gate 63. Thus upon the off-normal signal first appearing on the lead 41 the bistable circuit 62 is triggered and is only reset when the signal on the lead 41 disappears when a signal appears on the last lead 5 signifying that all the required digits have been written into the circuit 11.

Each of the individual switches of the switch unit 4 has previously been described as a 10-way switch so as to enable it to be preset to any one of 10 decimal digit values. In practice, it is convenient for at least some of the individual switches to have an 11th position in which position the appropriate lead 5 is not connected to any of the leads 6. This enables the switch unit 4 to store the number of a party to be called that has less decimal digits than there are individual switches of the unit 4 without otherwise affecting the operation of the apparatus.

We claim:

1. Telephone apparatus which is for connection over line wires to an automatic exchange and which has provision for supplying trains of dial impulses to enable a speech connection to be made through the exchange to only a single predetermined party, said telephone apparatus comprising a telephone instrument having a handset, a plurality of passive means each storing in preset manner a coded representation of the number of impulses of one of said trains, active electronic storage means, scanning means to scan said passive means to cause the numbers corresponding to the representations stored by the passive means to be written one at a time into the active electronic storage means, conversion means to cause trains of impulses to be generated in respect of the numbers stored by said storage means, and a single manually operable means upon operation of which said storage means, said scanning means and said conversion means are brought into use to generate the trains of impulses subsequent to a call having been initiated by lifting the handset of the telephone instrument.

2. Telephone apparatus according to claim 1 wherein means is provided to utilize part of the line current during use of the apparatus as the sole source of power for said storage means, said conversion means and said scanning means.

3. Telephone apparatus according to claim 2 wherein said means to power said storage means and said conversion means and said scanning means comprises a capacitor which is arranged to supply power to the storage means, conversion means and the scanning means during the generation of impulses for transmission to line and which is arranged to be charged by said line current.

4. Telephone apparatus according to claim 3 wherein the charging circuit for said capacitor includes a transistor switch which is arranged to be operated by an impulsing signal supplied by said conversion means to open and close that switch for the purpose of generating the trains of impulses.

5. Telephone apparatus according to claim 1 wherein said storage means includes a dynamic store of the recirculating type which is arranged to store the numbers written into this means as aforesaid.

6. Telephone apparatus according to claim 1 wherein each of said passive means is a multiway switch having at least 10 positions corresponding respectively to the numbers of impulses from 1 to 10.

7. Telephone apparatus according to claim 1 wherein said manually operable means is a push-button.

8. Telephone apparatus which is for connection over line wires to an automatic exchange and which has provision for supplying trains of dial impulses to enable a speech connection to be made through the exchange to only a single predetermined party, said telephone apparatus comprising a telephone instrument having a handset, a plurality of passive means respectively to store in preset manner a coded representation of the number of impulses of said trains, active electronic storage means, scanning means to scan said passive means to cause the numbers corresponding to the representation stored by the passive means to be written one at a time into the active electronic storage means, conversion means to cause trains of impulses to be generated in respect of the numbers stored by said storage means, manually operable means upon operation of which said storage means, said scanning means and said conversion means are brought into use to generate the trains of impulses subsequent to a call having been initiated by lifting the handset of the telephone instrument, and inhibiting means responsive to a predetermined one of said numbers stored by said passive means having been written into said active storage means temporarily to halt further operation of the scanning means.

9. Telephone apparatus according to claim 8 wherein operation of the scanning means is resumed after a predetermined period as determined by timing means.

* * * * *